UNITED STATES PATENT OFFICE.

MARCEL V. NENCKI, OF BERNE, SWITZERLAND, ASSIGNOR TO THE BADISCHE ANILIN AND SODA FABRIK, OF MANNHEIM, GERMANY.

GALLACETOPHENONE.

SPECIFICATION forming part of Letters Patent No. 443,402, dated December 23, 1890.

Application filed June 5, 1890. Serial No. 354,344. (Specimens.)

*To all whom it may concern:*

Be it known that I, MARCEL V. NENCKI, a citizen of Germany, residing at Berne, in Switzerland, have invented new and useful Improvements in the Production of Gallacetophenone, of which the following is a specification.

This invention relates to the production of gallacetophenone, a body first described in the *Journal für Practische Chemie*, (vol. 23, 2, pp. 151, 537, et seq.

The following example illustrates completely the manner in which the present invention can be carried into practical effect. The parts are by weight. Mix together about thirty (30) parts of pyrogallic acid (pyrogallol,) twenty (20) parts of glacial acetic acid, and ninety (90) parts of zinc chloride, and gradually raise the temperature of the mixture carefully to one hundred and five degrees centigrade, (105°C.) Stir continuously and maintain the temperature at this point for about seven (7) hours. By this time the melt usually becomes stiff. Next mix the product with about one hundred and twenty (120) parts of warm water and stir until it is dissolved, or nearly so. If necessary, heat up the mixture to render the solution more complete. Cool down to about ten degrees centigrade, (10°C.,) and allow it to stand for about fourteen (14) hours. Filter off the crystallized compound and purify by crystallization from hot water. Finally filter, press, and dry or preserve for use in the form of a paste.

In the above example the acetic acid can be replaced by an equivalent quantity of either acetyl chloride or of acetic anhydride.

The new product thus obtained, which has received the name of "gallacetophenone," is characterized by the following properties: It is a pale yellowish crystalline compound, coming into commerce usually as a thin paste. It is soluble in alkalies, and the solution on exposure to air immediately assumes a yellow color, which turns brown in a short time. If alcoholic potash be added to an alcoholic solution of gallacetophenone, a potassium salt is obtained in the form of white crystalline needles. Gallacetophenone melts at a temperature of about one hundred and sixty-eight degrees centigrade, (168°C.,) and on analysis gives figures corresponding to the formula $C_8H_8O_4$.

What I claim as new, and desire to secure by Letters Patent, is—

The herein-described chemical substance known as "gallacetophenone," which is characterized by the following properties: It is a pale yellowish crystalline substance soluble in hot water, from which it crystallizes out on cooling; it is readily soluble in alcohol; in cold benzine it is practically insoluble, and only very slightly soluble in boiling benzine, but soluble in alkalies, giving pale-yellow solutions, which soon turn brown on exposure to the air; it melts at about 168° centigrade, and on analysis it gives figures corresponding to $C_8H_8O_4$, substantially as described.

In testimony whereof I have hereunto set my hand in the presence of two subscribing witnesses.

M. V. NENCKI.

Witnesses:
 JOHANN WÄBER,
 S. HAUGH.